United States Patent [19]

Schapel et al.

[11] 4,160,754

[45] Jul. 10, 1979

[54] STABLE POLYMER GELS

[75] Inventors: Dietmar Schäpel, Cologne; Kuno Wagner, Leverkusen; Hanns P. Müller, Leverkusen; Manfred Dahm, Leverkusen, all of Fed. Rep. of Germany

[73] Assignee: Bayer Aktiengesellschaft, Leverkusen, Fed. Rep. of Germany

[21] Appl. No.: 886,316

[22] Filed: Mar. 13, 1978

[30] Foreign Application Priority Data

Mar. 25, 1977 [DE] Fed. Rep. of Germany ....... 2713198

[51] Int. Cl.² ............................................. C08L 61/24
[52] U.S. Cl. ............................... 260/29.4 R; 251/187; 251/188; 252/316; 260/17.3; 260/29.3; 260/30.2; 260/32.6 R; 260/32.6 N; 260/33.4 R; 260/33.6 R; 424/82; 528/254; 528/259; 528/269; 528/270
[58] Field of Search ...................... 260/29.4 R, 33.4 R, 260/68, 71, 72 B, 2.5 F; 252/522, 316, 30.2, 33.6 R, 32.6 N, 32.6 R; 424/82

[56] References Cited

U.S. PATENT DOCUMENTS 4,018,741   4/1977   Renner ............................ 260/29.4 R

FOREIGN PATENT DOCUMENTS 2310774 10/1976 France ...................................... 252/522

*Primary Examiner*—Theodore E. Pertilla
*Attorney, Agent, or Firm*—Gene Harsh; Joseph C. Gil; R. Brent Olson

[57] ABSTRACT

This invention is directed to gels which are stable in storage, comprising a polymer matrix, a liquid dispersing agent embedded therein and optionally fillers or additives, characterized in that said polymer matrix is a polycondensation product of aldehydes and aminoplast-formers, at least 30% by weight of the aminoplast-formers having a molecular weight of between 200 and 10,000 and containing at least one ether, thioether, acetal, ester, urethane and/or carbonate group.

12 Claims, No Drawings

STABLE POLYMER GELS

This invention relates to flexible, semi-rigid or rigid, compact or cellular polymer gels in which the high molecular weight matrix is built up of special aminoplast resins.

Some colloid solutions, for example those of gelatine, starch, soap or iron hydroxide in water or of natural rubber in benzene, can occur in a state which is no longer liquid but resembles a solid. For this state, Graham (Thomas Graham, 1805–1869) coined the term "gel", which was regarded as a special aggregate state of colloidal systems, in contrast to liquid "sols". Information on the present-day interpretation of gels may be found in textbooks on colloid chemistry, e.g. "Kolloidchemie" by Professor I. Stauff, Springer Verlag, Berlin, Gottingen, Heidelberg 1960.

The term "gel" will be used hereinafter also to describe the physical nature of the jelly-like end product rather than the exact polymer physical structure which is regarded as the relevant criterion of this state in present-day views on colloid chemistry. This does not mean that the novel gels described here do not in some cases have the same homogeneous structure that is generally attributed to gels, i.e. the structure of branched polymer networks of aminoplast resins swelled by water or alcohols.

The gels may either be in the form of compact masses or of foam gels. By foam gels are meant materials of a jelly-like consistency which contain air or other gases as disperse phase. In their structure, they differ both from foams in the colloid chemical sense and from foam plastics. Foams are defined as dispersions of relatively large volumes of gas in a relatively small volume of liquid. According to DIN 7726, foam plastics are diphasic systems in which a gas is dispersed in a continuous solid matrix. The term "plastics" is used to indicate the material character of the cellular substance. In contrast to foams in which the homogeneous phase is liquid and foam plastics in which the homogeneous phase is solid, in foam gels, the "homogeneous" phase exists in a particular colloidal state, that of a gel.

In substances which are termed "gels" within the meaning of this invention, there are three main components: the high molecular weight matrix, which forms the skeleton for the gel in the form of a polymer network, the liquid (hereinafter referred to as "dispersing agent") embedded in the matrix, and fillers or additives dissolved and/or dispersed and/or suspended in the dispersing agent.

Gels of the type described above can be prepared from various starting materials. They may be divided approximately into natural gels and synthetic gels. The natural gels are generally based on proteins or carbohydrates. Typical examples include the gels based on alginates, gelatine, pectine, agar-agar, karaya gums and tragacanth gums, starch and carob bean flour. Carboxymethyl cellulose and the polyurethane polyureas described in German Offenlegungsschrift No. 2,347,299, which can be converted to foam gels as has been described in German Offenlegungsschrift No. 2,521,277, are examples of synthetic gel-forming substances.

For natural gels, the best dispersing agent, i.e. the liquid immobilized in the gel, is invariably water. Some of the synthetic gel-formers, particularly the polyurethane polyureas, can be so widely varied in their structure that both polar liquids such as water, alcohols or glycols and non-polar liquids such as petroleum hydrocarbons or benzene can be embedded in them.

Gels based on naturally-occurring substances have numerous significant disadvantages which restrict their use. In general, it is only possible to produce gels in a reproducible manner from naturally-occurring substances if the starting materials have a high degree of purity. This means that it is necessary to use high quality products which can generally only be obtained after complicated methods of purification. Moreover, the raw materials are not always available in sufficient quantities.

Another disadvantage of natural products is that they cannot be widely varied in their properties. Although gels obtained from various classes of naturally-occurring substances differ slightly in their properties, it is difficult to optimize their properties to the various purposes for which gels could be used. Such variation in the properties would require a wide variation in the structure of the gels so that widely differing materials such as perfumes, sand, earth, vegetable waste and animal waste or pharmaceutically-active compositions could optimally be embedded or bound in the gels. The capacity of the gel to absorb the substance which is to be embedded or bound in it depends mainly on the interaction of this substance with the macromolecules of which the polymer network is composed. This is why the ability to vary the structure of the macromolecules is desirable. Another disadvantage of natural gels is that their temperature resistance is limited. They generally lose their mechanical strength at temperatures above 60° C.

As already described in German Offenlegungsschriften No. 2,347,299 and No. 2,521,277, the polyurethane polyurea gels and polyurethane polyurea foam gels described there have the desired capacity for variation. On the other hand, the raw materials required for producing these gels have one serious disadvantage. The gels as described in German Offenlegungsschriften No. 2,347,299 and No. 2,521,277 are prepared from prepolymers of polyols such as polyethers, polyesters and polycarbonates with excess quantities of polyisocyanates, by reacting these prepolymers containing isocyanate groups with chain lengthening agents particularly polyamines or water.

It is very difficult to embed in such a gel any substances which react with isocyanate groups. This applies particularly to the hydrogels which are commercially very interesting. The storage stability of mixtures of prepolymers and water is very limited due to the inevitable reaction between the components. This can lead to difficulties in processing, because the whole reaction mixture solidifies to a jelly-like mass within a relatively short time. The time available for processing these mixtures depends on various factors, particularly on the reactivity of the isocyanate groups and the pH of the solution. In the most unfavorable cases, it may be as little as a few seconds, so that such systems are virtually impossible to process.

For many potential applications of the gels, it is advantageous if the solutions or dispersions of the starting materials from which the gels are prepared have a low viscosity. This is particularly advantageous if the gels are mixed with solid substances such as sand, animal waste or vegetable waste. In that case, loose piles of such solid material can be solidified as gel simply by pouring the gel-forming substance over them. This is of particular interest for solidifying sand or other loose terrain.

For preparing gels, it is therefore desirable to use starting materials which, when dissolved or dispersed in the dispersing agents, give rise to low viscosity solutions or dispersions which are highly stable in storage and from which temperature-stable gels can be prepared but which are still highly adaptable in their high molecular weight matrix to the selected dispersing agent, as is the case with polyurethane polyureas.

DESCRIPTION OF THE INVENTION

It has been found that these requirements are fulfilled if the starting materials used for producing the high molecular weight matrix comprises aldehydes and aminoplast-formers which, at least in part, have a molecular weight of more than 200 and which contain at least one functional group selected from urethane, ether, thioether, acetal, carbonate and ester groups in addition to end groups which are capable of aminoplast formation. It must be regarded as surprising that gels can be obtained in this way since it is known that the condensation of conventional aminoplast-formers such as urea or melamine with formaldehyde in the aqueous phase in most cases gives rise to an aminoplast resin in the form of an unstable suspension which settles out.

The present invention thus relates to stable gels comprising a polymer matrix, a liquid dispersing agent embedded therein and, optionally, fillers and additives, characterized in that the polymer matrix is a polycondensation product of aldehydes and aminoplast-formers in which at least 30% by weight, preferably more than 50% by weight and most preferably more than 70% by weight, of the aminoplast-formers have a molecular weight of between 200 and 10,000, preferably between 350 and 6,000, and most preferably between 500 and 4,000 and contain at least one ether, thioether, acetal, ester, urethane or carbonate group.

The invention also relates to a process for preparing these gels, characterized in that N-alkylol compounds of the above defined aminoplast-formers and aldehydes and/or a mixture of aminoplast-former and aldehydes are polycondensed in the presence of dispersing agents and, optionally fillers and additives with the aid of an acid catalyst.

Aminoplasts are known to be synthetic resins which are generally obtained by a two-stage reaction as follows: in the first stage of the reaction, an N-alkylol compound is prepared from an aldehyde, usually formaldehyde, and an aminoplast-former which contains amino, imino or amide groups. In the second stage of the process, this N-alkylol compound is polycondensed to a high molecular weight, cross-linked synthetic resin by means of an acid, with the elimination of water optionally without first isolating the frequently unstable intermediate product. Known aminoplast-formers include, for example, urea, thiourea, guanidine, melamine, diamino triazines, amino diazines such as aminopyrimidines or aminoquinazolines as well as guanazoles and other heterocyclic amino compounds, urethanes, sulphonamides containing one or more sulphonic acid amide groups, cyanamide, dicyandiamide and aromatic amines, such as aniline, toluidine, xylidines, naphthylamines and phenylene diamines.

The gels in the instant invention are generally prepared from the above mentioned N-alkylol compounds although, they can also be prepared by a one-shot process. The reaction between the aldehyde and the aminoplast-former may be carried out either in an alkaline or in an acid medium. The reaction temperature, pH and molar ratio of starting components can be varied within relatively wide limits. They can easily be selected by the man of the art with the aid of a few simple preliminary tests so that the precondensate will have the desired viscosity.

The aminoplast-formers are generally alkylolated by addition of the calculated quantity of aldehyde at a pH of from 7–9, preferably 7–8. Alkylolation may be carried out at room temperature or at elevated temperatures up to 100° C., preferably at 60°–80° C. The time required for methylolation is, in most cases, 5 to 20 minutes. To obtain the gel according to the invention, the solution or dispersion of the N-alkylol compounds is subsequently adjusted to a pH of 0 to 6.5, preferably 1 to 3, by the addition of acid. The acids used for this purpose may be any mineral or organic acids with which it is possible, on the basis of their acid constant, to adjust the reaction medium to the desired pH.

Upon acidification and/or heating, the N-alkylol groups of the precondensate react with each other to eliminate water and form a high molecular weight network.

Aliphatic or cycloaliphatic aldehydes having from 1 to 8 carbon atoms are preferably used. Formaldehyde is particularly preferred.

The choice of aminoplast-former is essential to the invention. At least 30% by weight, preferably more than 50% by weight, and most preferably more than 70% by weight of the aminoplast-former should consist of compounds having a molecular weight of between 200 and 10,000, preferably between 350 and 6,000, most preferably between 500 and 4,000 and containing at least one ether, thioether, acetal, ester, urethane or carbonate group in addition to at least two end groups which are capable of aminoplast-formation. The aminoplast-former can of course contain a combination of the groups mentioned.

The compounds preferably used according to the invention as aminoplast-formers are compounds with terminal urea groups which have urethane, ether, thioether, acetal and/or ester groups in addition to the urea end groups.

Preferred modified ureas correspond to the following formula $$R(O-CO-NH-R'-NH-CO-NH_2)_n \qquad (I)$$

in which
R represents a residue of valency n which contains at least one ether, thioether, acetal, ester, ester amide and/or carbonate group and has a molecular weight of between 44 and 10,000,
R' represents the residue of an organic diisocyanate and
n represents an integer of from 2 to 8, and preferably 2 or 3, most preferably 2.

In spite of their small number of functional groups, these modified α,ω-bis-ureas are comparable in their condensation velocities in an aqueous medium to known aminoplasts. They can be converted into the N-methylol compounds in the same way as urea.

These modified α,ω-bis-ureas or tris-ureas, etc. are already known. They can be prepared, for example, by reacting ammonia or aqueous ammonia solutions with prepolymers which have isocyanate end groups and which have been obtained from polyols and/or compounds containing carboxyl groups and isocyanates. The modified α,ω-bis-ureas obtained are liquid, pasty or solid, depending on the choice of starting materials.

The isocyanates used as starting components for the preparation of the α,ω-ureas are generally known and may be aliphatic, cycloaliphatic, araliphatic, aromatic or heterocyclic polyisocyanates such as those described by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane as described in German Auslegeschrift No. 1,202,785 and U.S. Pat. No. 3,401,190; hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and mixtures of these isomers; diphenylmethane-2,4'-diisocyanate and/or 4,4'-diisocyanate; naphthylene-1,5-diisocyanate; triphenylmethane-4,4',4''-triisocyanate; polyphenylpolymethylene polyisocyanates which can be obtained by aniline-formaldehyde condensation followed by phosgenation and which have been described in British Pat. No. 874,430 and No. 848,671; m- and p-isocyanatophenyl-sulphonyl isocyanates as described in U.S. Pat. No. 3,454,606; perchlorinated aryl polyisocyanates such as those described in German Auslegeschrift No. 1,157,601 and U.S. Pat. No. 3,277,138; polyisocyanates having carbodiimide groups as described in German Pat. No. 1,092,007 and U.S. Pat. No. 3,152,162; diisocyanates of the kind described in U.S. Pat. No. 3,492,330; polyisocyanates with allophanate groups as described e.g. in British Pat. No. 994,890, in Belgian Pat. No. 761,626 and in published Dutch patent application No. 7,102,524; polyisocyanates with isocyanurate groups, e.g. as described in U.S. Pat. No. 3,001,973, German Nos. 1,022,789, 1,222,067 and 1,027,394 and in German Offenlegungsschriften Nos. 1,929,034 and 2,004,048; polyisocyanates with urethane groups as described e.g. in Belgian Pat. No. 752,261 and U.S. Pat. No. 3,394,164; polyisocyanates with acylated urea groups as described in German Pat. No. 1,230,778; polyisocyanates with biuret groups as described e.g. in German Pat. No. 1,101,394, U.S. Nos. 3,124,605 and 3,201,372 and British Pat. No. 889,050; polyisocyanates prepared by telomerization reactions as described in U.S. Pat. No. 3,654,106; polyisocyanates having ester groups such as those mentioned in British Nos. 965,474 and 1,072,956, U.S. Pat. No. 3,567,763 and German Pat. No. 1,231,688; reaction products of the above mentioned isocyanates with acetals as described in German Pat. No. 1,072,385 and polyisocyanates containing polymeric fatty acid groups as described in U.S. Pat. No. 3,455,883.

The distillation residues obtained from the commercial production of isocyanates and still containing isocyanate groups may also be used, optionally as solutions in one or more of the above mentioned polyisocyanates. Any mixtures of the above mentioned polyisocyanates may also be used.

As a general rule, it is particularly preferred to use readily available polyisocyanates such as tolylene-2,4-diisocyanate and -2,6-diisocyanate and mixtures of these isomers ("TDI"); polyphenyl-polymethylene polyisocyanates of the kind which can be prepared by aniline formaldehyde condensation followed by phosgenation (crude "MDI"); and, polyisocyanates containing carbodiimide groups, urethane groups, allophanate groups, isocyanurate groups, urea groups or biuret groups ("modified polyisocyanates").

Other starting components used for preparation of the α,ω-ureas are compounds with a molecular weight of from 78–10,000 having at least two isocyanate-reactive hydrogen atoms and at least one ether, thioether, acetal, ester, urethane and/or carbonate group. These compounds may have amino groups, thiol groups or carboxyl groups but are preferably polyhydroxyl compounds, particularly those having from 2 to 8 hydroxyl groups and especially those with a molecular weight from 100 to 10,000, preferably 200 to 6,000, e.g. polyesters, polyethers, polythioethers, polyacetals, polycarbonates or polyester amides having at least 2, generally 2 to 8, preferably 2 to 4 hydroxyl groups, such as the polyhydroxyl compounds of this kind which are known per se for the production of both homogeneous and cellular polyurethanes.

Suitable polyesters with hydroxyl groups include, e.g. reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, for example by halogen atoms and/or unsaturated. The following are mentioned as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and terephthalic acid-bis-glycol esters. The following are examples of suitable polyvalent alcohols: Ethylene glycol, propylene glycol-(1,2) and -(1,3), butylene glycol-(1,4) and -(2,3), hexane diol-(1,6), octane diol-(1,8), neopentylglycol, cyclohexane dimethanol (1,4-bis-hydroxymethylcyclohexane), 2-methyl-1,3-propane diol, glycerol, trimethylolpropane, hexane triol-(1,2,6), butane triol-(1,2,4), trimethylol ethane, pentaerythritol, quinitol and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as ε-caprolactone or hydroxycarboxylic acids such as Ω-hydroxycaproic acid may also be used.

Suitable polyacetals include, for example, the compounds which can be prepared from glycols such as diethylene glycol, triethylene glycol, 4,4'-dioxethoxy diphenyl dimethylmethane, hexane diol and formaldehyde. Suitable polyacetals for the invention can also be prepared by the polymerization of cyclic acetals.

Suitable polycarbonates with hydroxyl groups include those known per se, for example the hydroxyl polycarbonates which can be prepared by reacting diols such as propane diol-(1,3), butane diol-(1,4) and/or hexane diol-(1,6), diethylene glycol, triethylene glycol or tetraethylene glycol with diaryl carbonates such as diphenyl carbonate or phosgene.

Suitable polyester amides and polyamides include, for example, the predominantly linear condensates obtained from polybasic saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products obtained by reacting alkylene oxides with phenol formaldehyde resins or with urea formaldehyde resins may also be used according to the invention.

The polyethers used which have at least 2, generally 2 to 8 and preferably 2 to 3 hydroxyl groups are also known per se and are prepared, for example, by polymerization of epoxides such as ethylene oxide, propylene oxide, butylene oxide, tetrahydrofuran, styrene oxide or epichlorohydrin, either each on its own, e.g. in the presence of boron trifluoride or by the addition of these epoxides, either as mixtures or successively, to starting components having reactive hydrogen atoms, such as water, alcohols, ammonia or amines, e.g. ethylene glycol, propylene glycol-(1,3) or -(1,2), trimethylolpropane, 4,4'-dihydroxy-diphenylpropane, aniline, ethanolamine or ethylene diamine. Sucrose polyethers may also be used, e.g. those described in German Auslegeschriften Nos. 1,176,358 and 1,064,938. It is in many cases preferred to use polyethers which contain predominantly primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers as described in U.S. Pat. Nos. 3,383,351; 3,304,273; 3,523,093 and 3,110,695 and German Pat. No. 1,152,536 are also suitable, as well as polybutadienes which have hydroxyl groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the components.

Suitable low molecular weight diols include, for example, diethylene glycol, triethylene glycol, tetraethylene glycol, dipropylene glycol, tripropylene glycol, dibutylene glycol, 1,4-phenylene-bis-($\beta$-hydroxy ethyl ether), ester diols represented by the following general formulas:

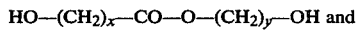
$$HO-(CH_2)_x-CO-O-(CH_2)_y-OH \text{ and}$$

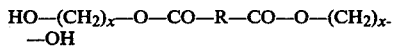
$$HO-(CH_2)_x-O-CO-R-CO-O-(CH_2)_x-OH$$

wherein
R represents an alkylene or arylene group having 1 to 10, preferably 2 to 6 carbon atoms,
x=2–6 and
y=3–5. Examples include $\delta$-hydroxybutyl-$\epsilon$-hydroxy caproic acid ester; $\omega$-hydroxyhexyl-$\gamma$-hydroxy butyric acid ester; adipic acid-bis-($\beta$-hydroxyethyl)-ester and terephthalic acid-bis-($\beta$-hydroxy ethyl)-ester. Also suitable are diol urethanes represented by the following general formula:

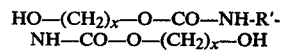
$$HO-(CH_2)_x-O-CO-NH-R'-NH-CO-O-(CH_2)_x-OH$$

wherein
R' represents an alkylene, cycloalkylene or arylene group having from 2 to 15, and preferably 2 to 6, carbon atoms, and
x represents a number between 2 and 6. Examples include, e.g. 1,6-hexamethylene-bis-($\beta$-hydroxyethyl urethane) or 4,4'-diphenylmethane-bis-($\delta$-hydroxybutyl urethane).

Representatives of the many compounds which may be used are generally known and have been described, for example, in High Polymers, Volume XVI, "Polyurethanes, Chemistry and Technology", by Saunders-Frisch, Interscience Publishers, New York, London, Volume I, 1962, pages 32–42 and pages 44–54, Volume II, 1964, pages 5–6 and 198–199 and in Kunststoff-Handbuch, Volume VII, Vieweg-Höchtlen, CarlHanser-Verlag, Munich, 1966, pages 45–71.

Mixtures of the above mentioned compounds having at least two isocyanate reactive hydrogen atoms and molecular weights of from 78 to 10,000 may also be used; for example, mixtures of polyethers and polyesters.

There may also be used polyhydroxyl compounds which contain high molecular weight polyadducts or polycondensates in a finely dispersed or dissolved form. Such modified polyhydroxyl compounds are obtained when polyaddition reactions (e.g. reactions between polyisocyanates and amino functional compounds) or polycondensation reactions (e.g. between formaldehyde and phenols and/or amines) are carried out in situ in the above mentioned hydroxyl compounds. Processes of this kind are known and have been described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These polyhydroxyl compounds can also be obtained as described in U.S. Pat. No. 3,869,413 or German Offenlegungsschrift 2,550,860 No. by mixing a previously prepared aqueous polymer dispersion with a polyhydroxyl compound and then removing the water from the mixture.

Cationic or anionic compounds or compounds capable of salt formation of the kind commonly used for the preparation of ionic polyurethanes may also be used for the preparation of the $\alpha,\omega$-bis-ureas. Compounds of this kind have been described by D. Dieterich and H. Reiff in Z. Angewandte Makromolekulare Chemie 26 (1972), p. 85–106 (No. 419) and in German Offenlegungsschrift No. 2,550,797.

Polyisocyanates and polyols are generally reacted with each other at an NCO/OH equivalent ratio of between 10:1 and 1.1:1, preferably between 7:1 and 1.3:1, most preferably at about 2:1.

The reaction of the isocyanate prepolymers with ammonia may be carried out either in a homogeneous phase or it may be carried out as an interface reaction, in which case the $\alpha,\omega$-ureas are obtained as dispersions in the dispersing agent used. The first mentioned method may be used if, for example, prepolymers of polyethers having a high ethylene oxide content are reacted with aqueous ammonia in aqueous solution. The second method is suitable if, for example, prepolymers of hydrophobic polyethers are reacted with aqueous ammonia in aqueous dispersion. The solutions or dispersions obtained may be used in the same way as pure α,ω-bis-ureas as starting materials for preparing the aminoplast gels.

Another method of synthesis for preparing useful α,ω-bis-ureas consists of reacting polyethers which have amino end groups with urea in a solvent-free reaction mixture. Suitable amino polyethers have been described in German Offenlegungsschrift No. 2,546,536.

Another preferred class of aminoplast-formers are compounds with terminal carbamate groups which have urethane, ether, thioether, acetal and/or ester groups in addition to the urethane end groups. Particularly preferred carbamates correspond to the following formula:

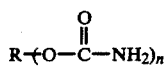
 II in which R and n have the same meaning as in formula (I) above.

These α,ω-bis-urethanes (or tris-urethanes, etc.) may be obtained by a solvent-free reaction of polyhydroxyl compounds

with urea. Another preferred method for the production of compounds corresponding to formula (II) comprises reacting the polyhydroxyl compounds

with phosgene followed by reaction of the phosgenation product with ammonia.

Apart from α,ω-bis-ureas and α,ω-bis-carbamates which are preferred, other aminoplast-formers may also be used for the preparation of gels, provided that they have a molecular weight of more than 200 and contain at least one ether, thioether, acetal, ester, urethane or carbonate group. Examples of such compounds include α,ω-bis-acid amides; α,ω-biurets which may be obtained, for example, by solvent-free condensation of α,ω-bis-ureas with urea; and bis-anthranilates which can be obtained, for example, by reacting the above mentioned polyols with isatoic acid anhydride by one of the processes described in U.S. Pat. No. 3,808,250, U.S. Pat. No. 3,975,428 and German Offenlegungsschrift No. 2,619,840.

In addition to the bis-ureas, bis-urethanes, bis-amides, bis-biurets and bis-anthranilates described above, corresponding higher functional aminoplast-formers such as tris-ureas, tris-anthranilates, and the like may also be used.

The ureas, urethanes, and the like may be used directly to prepare the aminoplast gels according to the invention but for various reasons it is often advisable to incorporate in them a certain proportion of reactive alkylol and/or alkylol ether groups (precondensates) by reacting them in a preliminary stage with carbonyl compounds, i.e. particularly with aldehydes. Examples of suitable aldehydes include formaldehyde, acetaldehyde, butyraldehyde, cyclohexane aldehyde, benzaldehyde, salicylic aldehyde, 4-methyl benzaldehyde and terephthalic dialdehyde.

It is preferred in the process to use formaldehyde in aqueous solution or in gaseous form, any compounds which split off formaldehyde or which react like formaldehyde, e.g. its hemiacetals with monofunctional or polyfunctional alcohols such as methanol, ethanol, butanol, ethylene glycol, diethylene glycol, etc., and acetaldehyde or chloral for reaction with the above mentioned aminoplastformers. Aqueous formaldehyde is particularly preferred.

In a particular variation of the process of the invention, reaction products of alkoxymethyl isocyanates (preferably methoxymethyl isocyanate) with the above described polyhydroxyl compounds or amino polyethers, e.g. the compounds described in U.S. Pat. No. 3,415,768 or U.S. Pat. No. 3,474,061 are used as aminoplast-formers. These N-alkoxy methyl urethanes and -ureas can be directly converted into the aminoplast resin by acidification.

Another special variation of the process for preparing the gels of the instant invention comprises reacting the aminoplast-formers described above, or conventional aminoplast-formers such as urea or melamine, with formaldehyde and one of the polyols described above, preferably a polyether polyol. This reaction gives rise to polymers which have recurrent O-N-acetal structural units, preferably those represented by the following formula:

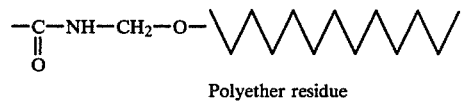

Polyether residue

Although the compounds mentioned so far and their N-alkylol derivatives are the preferred starting materials for aminoplast-formation, it is in some cases advantageous to combine these preferred materials with other compounds which are capable of formaldehyde condensation. In this way, the C/O/N-ratio of the aminoplasts and hence the physical properties of the gels such as their hardness, toughness, capacity for swelling, water-retention capacity, water-adsorption capacity and their bactericidal and fungicidal activity can be varied in a controlled manner to adapt them as desired to the purpose for which they are to be used.

The nitrogen compounds described below which are capable of aminoplast-formation may be used in the process in a quantity of 0–70% by weight, preferably 0–50% and most preferably 0–30% by weight, based on the total quantity of aminoplast-formers.

Compounds which can be rapidly and easily built into the molecule by mixed condensation include the following: Polyurethanes, ureas and polyureas having NH$_2$-end groups, polyamides of poly-(β-alanine) with molecular weights of up to 2000, N-methylol-methyl ethers of polycaprolactam, polythiolactams, polypeptides of N-carboxy-α-aminocarboxylic acids, low molecular weight polyamides of aliphatic dicarboxylic acids and diamines, polyamides of cycloaliphatic components and aromatic components, polyamides containing oxygen, sulphur or nitrogen as hetero-atoms, polyester amides, mixed condensates which contain ester, urethane or urea groups in addition to amide groups, ethoxylated and propoxylated monoamides and polyamides, polyhydrazides and polyamino triazoles, polysulfonamides, phenol-formaldehyde mixed condensates with urea, phenoplasts which can be dispersed in water, latices of anionic or cationic polyurethane dispersions containing amide groups, melamine and dicyandiamide, low molecular weight aniline-formaldehyde condensates, sulfonic acid amides, mono and dinitriles, acrylonitrile, urotropine, hexahydrotriazines, condensates of primary amines and formaldehyde, Schiff's bases and ketimines or polyketimines such as those produced from one mol of hexamethylene diamine and two mols of cyclohexanone, polyaddition products and polycondensation products of melamine and other amino heterocyclic compounds with aldehydes and alcohols (for example penta and hexamethylol melaminemethyl ethers), polyaddition and polycondensation products of nitriles with aldehydes, reaction products of phosphorous acid and phosphine with carbonyl compounds. The incorporation of from 0.5–20% of stilbene compounds containing groups which have a tendency to N-methylol formation as well as other brightening agents, e.g. those which have an unsubstituted sulfonamide group in their molecule, is also possible according to the invention. The following are also suitable compounds: 1,3,5-tri-(4'-sulphamyl-phenylamino)-triazine; melamine-monomethyleneacrylamide; ureido and thioureido compounds having a substituted or unsubstituted vinyl group and alkylated methylol group as described in German Pat. No. 1,018,413; N-cycloalkyl-N'-dialkyl ureas; alkylene ethers of salicylic acid amide; benzene sulphonamide; reaction products of methoxy methyl isocyanate with mono-, di- and polyamines; carbaminyl amides as described in German Pat. No. 943,329; N-carboxylic acid monoureides; esters of α-olefine-N-dicarboxylic acid monoureides as described in German Pat. No. 1,005,057; addition products and condensation products of carbonyl compounds and hydrazine carboxylic acid esters; 2-hydrazino-4,6-bis-diethylamino-1,3,5-triazine; monomethoxy dirhodano triazine; ethylamino dirhodano triazine; substituted acid hydrazides of isopropyl hydrazine and stearic acid; 2-aminothiazole; 2-aminotriazole; dichloro maleic imide; reaction products of 1 mol of methoxy methyl isocyanate and 1 mol of trimethylol amino methane; addition products or condensation products of N-carbonyl-sulfonamic acid chloride with ammonia; primary amines; maleic acid hydrazide; hydrazo-dicarboxylic acid diethyl ester; hydrazo dicarbonamide; polyhydrazo dicarbonamides; hydroxy ethyl urethane; phenyl hydrazine; bis-biguanides; aminoguanidine; disodium ethylene-bis-dithiocarbamates; phosphoric and phosphorous amides; acylaminoguanidine; benzoyl dicyanidiamide; 1,3- disubstituted 5-amino-1,2,4-triazoles as described in German Pat. No. 1,241,835; and maleic acid monoamides. Polyureas obtained by the reaction of ammonia and monoamines with isocyanato aryl esters of phosphoric, thiophosphoric, phosphonic and thiophosphonic acids as described in German Pat. No. 1,129,149 are also suitable. The following may also be used: Mixtures of 1,3-dimethylol-5-alkyl-hexahydro-1,3,5-triazone-(2) and methmethylol ureas as described in German Pat. No. 1,133,386; condensation products of dicyanidiamide and nitriles such as 2,6-diamino-4-phenyl-1,3,5-triazine (benzo guanamine), isobutylidene-diurea, α-chloroisobutylidene-diurea, methacrylamido-benzenesulfonic acid-(N-methane sulphonyl)-amide, dimethylol glyoxal monoureine, dithioureas which can be obtained by reacting ammonia or primary amines with the isocyanates as described in German Pat. No. 1,241,440; isourea ethers and isobiuret ether derivatives as described in German Pat. No. 1,240,844, cyano-substituted aliphatic ureas obtained by reacting ammonia with cyano-substituted aliphatic isothiocyanates as described in German Pat. No. 1,121,606; low molecular weight mixed condensates of melamine, urea, dicyan diamide and thiourea, methylolated polyureido polyamides which can be prepared according to German Pat. No. 1,034,857 by the reaction of ε-caprolactam with diethylene triamine followed by urea condensation and formaldehyde addition. Other compounds which should be mentioned include aminoplast resins of dicyanidamide, formaldehyde and formic acid as described in German Pat. No. 1,040,236; condensation products of primary amines, epichlorohydrin and urea; condensation products prepared by reacting sulfomethylated phenols and mono-, di- or trimethylol urea or methylol compounds of acid amides; ethoxylation products of diethylene triamine, water-soluble hexamethylol melamine condensates and their reaction products with epichlorohydrin, low molecular weight urea-phenol mixed condensates, N,N'-dimethylolurone, methylene-bis-methylolurone-methyl ether, melamine condensates and melamine-mixed condensates; condensation products of trimethylol phosgene oxide and methylol melamine, mixed condensates of melamine, formaldehyde and polyamines prepared as described in German Pat. No. 1,059,659; methylol-containing mixed condensates of 1 mol benzoguanamine, 3 mols of melamine and 5 mols of formaldehyde; mixed condensates of dicyanodiamide and naphthalene sulfonic acids which have been condensed with formaldehyde; water-soluble condensation products of tri- and tetramethylol melamine optionally modified with other compounds capable of aminoplast-formation; methylol-containing mixed condensates of melamine, urea, guanidine, dicyan diamine, formaldehyde and diethyl malonate; water-soluble, resinous condensation products of 1 mol of urea and 1 or 2 mols of acrylic acid or methacrylic acid; alkylene dimelamines which can be prepared by reacting dicyandiamide with cyanamino nitriles in the presence of potassium hydroxide; condensation products of mono and dimethylol urea or thiourea with glyoxal; modified carbamide-methylol ethers as described in German Pat. No. 1,017,787, for example those obtained from urea, melamine, butanol and methacrylic acid; reaction products of formaldehyde condensation products of compounds of the amino triazine group or of the urea group which have free N-methylol groups with nitriles or amides of unsaturated polymerizable or copolymerizable acids prepared as described in German Pat. No. 1,005,270; vinyloxy alkyl melamines containing methylol groups, methylol compounds of reaction products of diisocyanates with 1 mol of ethylene imine and 1 mol of ammonia or primary amines; methylol methyl ethers of methacrylamide or acrylamide; methylol compounds of N-vinyl derivatives; N,N'-alkylated cyclic ureas such as N-vinyl-N,N'-ethylene urea; methylol compounds of amides of phosphoric and thiophosphoric acid; methylol compounds of biguanides; methylol-containing addition products of carbamic acid esters and glyoxal; methylol-containing mercapto fatty acid hydrazides of methyl thioglycolate and hydrazine; formamide, tertiary butyl formamide, polyureas of tetraethylene pentamine and urea, methylol-containing quaternary ammonium derivatives of aminoaceto guanamine as described in German Pat. No. 1,032,259, and N-methylol compounds of biuret or N-alkylated biuret derivatives. Also to be included in this list are compounds such as benzene sulfoallylamide, methane sulfoallylamide, dimethylamino sulfoallylamide, methylol-compounds of hydantoin and derivatives thereof, methylol compounds of salicylic acid amide such as 5-chloro-2-oxybenzene-1-carboxylic acid-n-amylamide, dichlorophenoxy acetic acid amides, 2-amino-4-(ethylthio)-butyric acid, 2-amino-4-methoxy butyric acid and 2-amino-4-(methylsulfonyl)-butyric acid which are effective against fungi, viruses, bacteria and other parasitic organisms and which can be fixed into the products of the process by formaldehyde condensation. Methylol compounds of low molecular condensation products of cyclic lactim-O-alkyl ethers such as butyrolactim ether, valerolactim ether or caprolactim ether with monoacylated hydrazines or urea, thiourea, bishydrazides or semicarbazide may also be used.

Other compounds capable of aminoplast-formation which may be used as cocomponents for the process are polyfunctional N-formyl compounds or acetyl compounds such as those obtained from hydrazine; N-methyl hydrazine; N,N'-dimethyl and -diethyl hydrazine; ethylene diamine; trimethylene diamine; 1,2-diamine-propylene diamine, tetramethylene diamine; N-methyl-propylene-1,3-diamine; pentamethylene diamine; trimethyl hexamethylene diamine; hexamethylene diamine; octamethylene diamine; undecamethylene diamine; diamino methyl cyclobutane; 1,4-diamino cyclohexane; 1,4-diamino-dicyclohexyl methane; 1-methyl-2,4-diaminocyclohexane; 1-methyl-2,6-diamino cyclohexane; m-xylylene diamine; 1-amino-3,3,5-trimethyl-5-aminomethyl-cyclohexane; p-aminobenzylamine; 3-chloro-4-aminobenzylamine; hexahydrobenzidine; 2,6-dichloro-1,4-diaminobenzene; p-phenylene diamine; tolylene diamine-(2,4); 1,3,5-triisopropylphenylene diamine-(2,4); 1,3,5-trimethylphenylene diamine(2,4); 1-methyl-3,5-diethylphenylene diamine-(2,4); 1-methyl-3,5-diethyl-phenylene diamine-(2,6); 4,4'-diamino diphenyl methane and 4,4'-diamino diphenyl ether.

The addition of from 0.5 to 30% by weight, based on the total quantity of aminoplast-forming starting compounds, of chain-breaking compounds has proved to be particularly valuable for the production of aminoplast gels. Particularly suitable compounds of this kind include lactams such as ε-caprolactam, valerolactam, butyrolactam and the corresponding thiolactams. The use of these chain-breakers as mixtures with higher functional nitrogen compounds provides a simple method of adjusting the products of the process to the desired viscosity.

In a particular embodiment of the process, compounds which in addition to containing groups capable of aminoplast-formation contain groups (e.g. chromophores) which impart to the compounds the properties of dyes and/or brightening agents are added in quantities of from 0.5-20% by weight, preferably from 2-14% by weight, based on the total quantity of aminoplast-forming starting compounds. Colored aminoplast gels with exceptionally high color stability can be obtained by incorporating such compounds. Examples of such compounds include brightening agents represented by the following formulae:

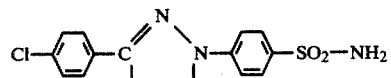

or

-continued

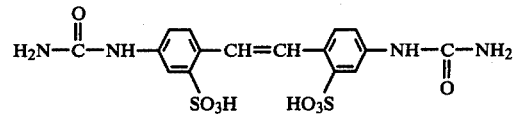

In addition to the preferred compounds which are capable of aminoplast-formation, compounds capable of phenoplast-formation may also be added as modifying agents in a quantity of from 0.5-60% by weight, preferably from 5-40%, based on the total quantity of aminoplast-forming starting compounds. The addition of these phenoplast-forming compounds does not lower the velocity of condensation.

The following compounds capable of phenoplast-formation are preferred: Phenol, bisphenol, resols from phenol or bisphenol and formaldehyde, condensation products of phenol and cyclohexanone, phenol sulfonic acids, naphthalene sulphonic acids, and the like.

Various simple methods are available for preparing aminoplast gels. For example, the N-alkylol compounds of the aminoplast-formers may be dissolved in the dispersing agent which is required to be immobilized, additives may then be added if desired, and the gel can then be formed by the addition of acids or components which are acid in reaction. Alternatively, all the components may be added together at once, i.e. the N-alkylol compounds of the aminoplast-formers, the substance which is to be immobilized, the additives and any hardening catalyst necessary. These methods of preparation can be carried out either continuously or batchwise.

Gel formation is facilitated and the quality of the gel is improved by vigorous mixing of the starting components. In the simplest case, mixing can be achieved in a zone of increased turbulence such as that obtained in a conventional mechanical stirrer apparatus. Better results can be obtained by using high-speed mixing assemblies, for example impeller homogenizers or a stirrer and mixing chamber of the kind conventionally used in polyurethane foaming machines. Vigorous mixing can also be achieved by using the mixing apparatus of polyurethane foaming machines in which the components are mixed by counter-current injection.

If desired, air may be beaten into the reactants during preparation of the gels. This gives rise to foam gels which have a low density compared to that of compact gels. The density of the foam gels depends on the quantity of air beaten into the components and the use made of the air, i.e. the velocity of cross-linking correctly adapted to the quantity of blowing agent used. As a general rule, up to 40%, by volume, and preferably up to 20%, by volume, of air can be stirred into the reaction mixture.

Foam gels can also be obtained by subjecting the reaction mixture to a vacuum before it is formed into a gel. They can also be obtained by adding readily volatile blowing agents such as fluorotrichloromethane.

The maximum quantity of dispersing agent which may be used for the formation of the aminoplast gels may vary within wide limits and is not critical. It may be up to 90% by weight, based on the total quantity of gel. However, the properties of the gels obtained are strongly influenced by the proportion of polymer to dispersing agents. As a general rule, the aminoplast gels become progressively more stable and rigid with increasing proportion of polymer and softer and less structurally rigid with decreasing polymer content, down to the limit of about 10% by weight. The gels preferably contain from 20 to 90% by weight of dispersing agent, based on the total quantity of gel mass.

Both hydrophilic and hydrophobic substances may be used as dispersing agents for the gels, depending on the hydrophilic or hydrophobic character of the starting components. Examples of hydrophilic substances include water, straight or branched chain aliphatic or cycloaliphatic mono- or poly- alcohols with 1 to 8 carbon atoms (for example methanol, ethanol, isopropanol, ethylene glycol, butanol, glycerol, diethylene glycol or trimethylol propane), dimethyl formamide, N-methylpyrrolidone, caprolactam or mixtures of these compounds. Examples of hydrophobic materials include petroleum hydrocarbons and benzene.

It is particularly surprising that the gels are so very stable. No sign of phase separation such as clouding of the material occurs even after prolonged storage. The dispersing agent is very firmly bound in the gel.

The velocity of gel formation depends on various parameters. The nature and quantity of the catalysts added for condensation of the N-alkylol compounds are particularly important. The reaction time is normally between 0.5 and 2 minutes but can be greatly shortened, down to only one second or less, by raising the temperature, preferably to 60°-80° C. Suitable catalysts include, for example, mineral acids such as sulfuric acid, phosphoric acid, hydrochloric acid and nitric acid and organic carboxylic or sulfonic acids such as formic acid, acetic acid, propionic acid, p-toluene sulfonic acid and perfluoromethane sulfonic acid. From 0.1-5% by weight of acid, preferably phosphoric acid, based on the total quantity of reaction mixture, is generally added for gel formation.

Various fillers may also be added in considerable quantities, up to 50% by weight, in the preparation of the aminoplast gels. Suitable fillers include silicates, the various types of silicic acid, silica sols, aluminum oxide, tin oxides, antimony trioxide, titanium dioxide, graphite and graphitized carbon, carbon black, retort carbon, pulverulent polymethylene ureas, drifting sand, pulverulent types of cement, various inorganic and organic dye pigments, e.g. iron oxide pigments, lead chromate, lead oxide, red lead, copper phthalocyanines and the like.

Short or long fibers of natural or synthetic materials, e.g. cellulose powder, may also be used as fillers. Soaps, surface-active agents, plant nutrients, perfume, salts, fertilizers and aqueous solutions of other natural or synthetic polymers may also be added in the preparation of the aminoplast gels.

The gels obtained can be used for various purposes. Owing to their high elasticity, they can be used as cushioning or padding or shock-absorbing parts, while water gels can be used as substrates for hydrocultures. They are also excellent binders for solid and fibrous fillers. Hydrogels, for example, are excellent flame-resistent insulating materials and also provide a simple means for solidifying sandy and unstable terrain.

One preferred use of these gels is as perfume carriers which can be prepared by adding perfumes during formation of the gels, similarly to the method described in German Offenlegungsschrift No. 2,544,777.

The following examples serve to explain the process according to the invention. The figures given represent parts by weight of percentages by weight unless otherwise indicated.

EXAMPLES

EXAMPLE 1

(a) Preparation of a polyether having urea end groups 620 parts by weight of a polyethylene glycol having a molecular weight of 1550 and 0.8 parts by weight of para-toluene sulfonic acid are mixed together and dehydrated for 30 minutes at a pressure of 12 bar at a temperature of 100° C. 134.4 parts by weight of 1,6-diisocyanato hexane are added in one stage to the resulting clear solution at 70°-80° C. The reaction mixture is then stirred under an atmosphere of nitrogen for 2 hours at 100° C.

When it has been cooled to 50° C., the mixture, which has an isocyanate content of 4.05%, is introduced dropwise into 767 parts by weight of 1.67% aqueous ammonia solution. A 50% aqueous solution of a polyethylene glycol having urea end groups is obtained. The viscosity of the solution at 25° C. is 360 mPas. When stored at room temperature, the solution changes into a reversible gel state.

(b) Process according to the invention 100 parts by weight of the solution described under (a) are heated to 60° C., and 5.2 parts by weight of a 30% aqueous formaldehyde solution are added. 6 ml of 85% phosphoric acid are added to the reaction mixture with mechanical stirring (rate of stirrer 1200 revs. per min.). A hard elastic gel forms spontaneously.

EXAMPLE 2

A mixture of 100 parts by weight of the solution described in Example 1(a) and 100 parts by weight of water is heated to 60° C., and 5.2 parts by weight of a 30% aqueous formaldehyde solution are added. 6 ml of 85% phosphoric acid are added to the reaction mixture with stirring. Gel-formation begins after 20 minutes. After a further 40 minutes, a solid gel is obtained, and after 12 hours, this gel is completely hardened. The gel has a soft, elastic consistency.

EXAMPLE 3

6 ml of 85% aqueous phosphoric acid are added to 94 parts by weight of the solution described in Example 1a. A solution of 15 parts by weight of urea and 24.3 parts by weight of 37% aqueous formaldehyde solution is added to this mixture with stirring. The reaction mixture heats up to 60° C. A milky-white, tack-free gel is obtained after 5 minutes.

EXAMPLE 4

188 parts by weight of the solution described in Example 1a are mixed with 12 ml of 85% phosphoric acid. 8.1 parts by weight of a 37% aqueous formaldehyde solution and 20 parts by weight of monofluorotrichloromethane are then added. The reaction mixture is vigorously stirred for 30 seconds. Gel-formation accompanied by foaming begins in 2 minutes after the beginning of mixing and is completed after a further 3 minutes. When the reaction mixture foams up, it expands by 40% of its starting volume.

EXAMPLE 5

(a) Preparation of a polyether having N-methylolurea end groups 0.15 ml of para-toluene sulfonic acid methyl ester are added to 396.6 parts by weight of 1.6-diisocyanato hexane and the mixture is heated to 120° C. 194 parts by weight of tetraethylene glycol are then added dropwise at such a rate that the temperature of the reaction mixture does not rise above 120° C. The prepolymer is then left to cool. It has an isocyanate content of 17.7%.

The prepolymer is then diluted with 600 parts by weight of dimethyl formamide and introduced dropwise into 443 parts by weight of a 9.25% aqueous ammonia solution. 21 parts by weight of a 37% aqueous formaldehyde solution are then added. A 36% solution in the dimethyl formamide/water mixture of tetraethylene glycol containing N-methylol urea end groups is obtained. The solution has a pH of 7.0. It changes into a pasty substance when stored at room temperature.

(b) Process according to the invention 100 parts by weight of the solution described above are heated to 80° C. 15 parts by weight of a 30% aqueous formaldehyde solution and 6 ml of 28% aqueous phosphoric acid are then rapidly added with stirring. A milky-cloudy gel with hard elastic properties forms after only 2 seconds of stirring.

EXAMPLE 6

(a) Preparation of a polyether with urea end groups 336 parts by weight of 1,6-diisocyanato hexane are heated to 150° C. under nitrogen. A solution of 0.2 parts by weight of para-toluene sulfonic acid in 370 parts by weight of octaethylene glycol is then added dropwise with stirring. After cooling, the prepolymer, which has an isocyanate content of 11.6%, is dissolved in 185 parts by weight of dimethyl formamide. The resulting solution is introduced dropwise into 650 parts by weight of a 5.5% aqueous ammonia solution. A 50% solution in a dimethyl formamide/water mixture of the octaethylene glycol modified with urea end groups is obtained. This solution changes into a pasty state at room temperature.

(b) Process according to the invention 23.4 parts by weight of a 30% aqueous formaldehyde solution are added at 60° C. to 100 parts by weight of the solution described above. After the addition of 6 ml of 85% aqueous phosphoric acid, gel-formation sets in after a reaction time of 2 seconds. The gel has a hard elastic character.

EXAMPLE 7

100 parts by weight of the solution described in Example 6a are diluted with 100 parts by weight of water and heated to 60° C. 23.4 parts by weight of a 30% aqueous formaldehyde solution are added. A gel forms 15 seconds after the addition of 6 ml of 85% aqueous phosphoric acid.

What is claimed is:

1. Gels which are stable in storage, comprising a polymer matrix, a liquid dispersing agent embedded therein and optionally fillers or additives, characterized in that said polymer matrix is a polycondensation product from aldehydes and aminoplast-formers, at least 30% by weight of the aminoplast-formers having a molecular weight of between 200 and 10,000 and containing at least one functional group selected from the group consisting of ether, thioether, acetal, ester, urethane and carbonate groups.

2. The gels of claim 1 wherein at least 50%, by weight of said aminoplast-formers have a molecular weight of 350 to 6,000.

3. The gels of claim 2 wherein at least 70%, by weight of said aminoplast-formers have a molecular weight of 500 to 4,000.

4. The gels of claim 1 wherein said aldehydes have from 1 to 8 carbon atoms.

5. The gels of claim 1 wherein said aminoplast formers have at least two end groups which are capable of aminoplast-formation.

6. The gels of claim 1 wherein said aminoplast-former is an $\alpha,\omega$-bis-urea.

7. The gels of claim 6 wherein said $\alpha,\omega$-bis-urea corresponds to the following formula:

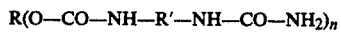

wherein

R represents a residue of valency n which contains at least one ether, thioether, acetal, ester, ester amide and/or carbonate group and has a molecular weight of between 44 and 10,000;

R' represents the residue of a diisocyanate; and n represents an integer of from 2 to 8.

8. The gels of claim 1 wherein said aminoplast-former is an $\alpha,\omega$-bis-carbamate.

9. The gels of claim 8 wherein said $\alpha,\omega$-bis-carbamate corresponds to the following formula:

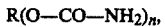

wherein R and n are defined as in claim 7.

10. The gels of claim 1 wherein they contain water and/or an alcohol as dispersing agent.

11. A process for the preparation of gels, comprising: polycondensing aldehydes and N-alkylol compounds of aminoplast-formers, at least 30% by weight having a molecular weight of 200 to 10,000 and containing at least one ether, thioether, acetal, ester, urethane and/or carbonate group, by means of an acid catalyst in the presence of dispersing agents and optionally fillers or additives.

12. A process for producing carriers for perfumes, comprising adding perfumes during formation of a gel formed by polycondensing aldehydes and N-alkylol compounds of aminoplast-formers, at least 30% by weight having a molecular weight of 200 to 10,000 and containing at least one ether, thioether, acetal, ester, urethane and/or carbonate group, by means of an acid catalyst in the presence of dispersing agents and optionally fillers or additives.

* * * * *